United States Patent [19]
Evrard

[11] Patent Number: 5,850,895
[45] Date of Patent: Dec. 22, 1998

[54] METALLIC AIRCRAFT BRAKE DISK HAVING THERMAL RELIEF SLOTS

[75] Inventor: John G. Evrard, Canal Fulton, Ohio

[73] Assignee: Aircraft Braking Systems Corporation, Akron, Ohio

[21] Appl. No.: 854,317

[22] Filed: May 12, 1997

[51] Int. Cl.⁶ .............................. F16D 65/78; F16D 65/10
[52] U.S. Cl. ................... 188/264 A; 188/218 XL
[58] Field of Search ................. 188/18 A, 71.6, 188/264 A, 264 AA, 218 XL; 192/113.2, 113.21, 113.22, 113.26, 113.3

[56] References Cited

U.S. PATENT DOCUMENTS

| | | | |
|---|---|---|---|
| 2,850,118 | 9/1958 | Byers | 188/218 XL |
| 3,301,356 | 1/1967 | Pompa | 188/218 XL |
| 3,403,758 | 10/1968 | Stout | 188/218 XL |
| 4,286,694 | 9/1981 | Wisewau, Jr. et al. | 188/264 AA |
| 5,176,236 | 1/1993 | Ghidorzi et al. | 188/218 XL |

*Primary Examiner*—Robert J. Oberleitner
*Assistant Examiner*—Chris Schwartz
*Attorney, Agent, or Firm*—Renner, Kenner, Greive, Bobak, Taylor & Weber

[57] ABSTRACT

A metallic aircraft brake disk having thermal relief slots therein is provided. The brake disk is of an annular shape with force bearing slots in one of the circumferential surfaces thereof to engage the disk with a portion of the aircraft. A plurality of thermal relief slots extend from an opposite circumferential surface of the annular brake disk. The thermal relief slots are in the shape of a dual armed hook anchors and are configured to minimize the amount of material removed to form each slot, while maximizing certain radii of the slot head. Particularly, an elongated radial slot terminates in a slot head, the slot head being formed of a number of interconnected curvate surfaces. The radii of the curvate surface opposite the end of the radial slot is maximized.

10 Claims, 1 Drawing Sheet

METALLIC AIRCRAFT BRAKE DISK HAVING THERMAL RELIEF SLOTS

TECHNICAL FIELD

The invention herein resides in the art of aircraft brake assemblies and, more particularly, to the rotor and stator disks thereof. Specifically, the invention relates to the implementation of thermal relief slots within the disks, such slots being configured as a dual armed hook anchors.

BACKGROUND ART

It is well known that aircraft brakes typically employ a heat sink of alternatingly interleaved rotor and stator disks, the rotor disks being keyed to the aircraft wheel and the stator disks being splined to the aircraft axle. In many aircraft, the brake disks are made of steel or an appropriate alloy. In such instances, the disks of one of the sets are populated with wear pads, while the disks of the other set simply comprise annular steel disks. In the embodiment of the invention presented herein, the stators are to be populated with the wear pads, while the rotors are simply steel disks—although that relationship may be switched for particular applications. Indeed, the concept of the invention also applies where one or the other disks may be a segmented disk.

Since the function of a brake is to convert mechanical energy into heat and to dissipate the heat through the heat sink of the brake disk stack, the stators and rotors are subjected to significant temperatures during braking operations. The heat which builds up in the disks during braking has a tendency to distort the disks and, to relieve or reduce such distortion, it has been known to provide thermal relief slots in the disks, the same entering from one circumferential surface thereof, being uniformly spaced about the disk, and extending well into the wear surface of the disk. The thermal slots accommodate thermal expansion of the disk, allowing the effectively segmented parts to move or expand toward or away from each other without buckling or axial distortion. Such thermal relief slots have been quite effective in that regard.

The thermal relief slots of the prior art have typically terminated in a circular bore passing axially through the disk. It has been found that high levels of thermal stress develop about the terminal bore of the thermal relief slots. Such thermal stress, over time, gives rise to cracking of the brake disk in the area of the terminal bore, increasing the need for brake disk service, replacement or repair. It has particularly been found that the level of stress generated at the terminal bore is inversely related to the radius of the bore. Accordingly, the prior art has taught the use of rather large terminal bores to minimize such stress. However, the thermal relief slots and associated terminal bores reduce the mass of the brake disk and similarly reduce the total mass of the brake disk heat sink. Since it is most desirable to maximize the mass of the heat sink, there are conflicting interests respecting the size of the slots and terminal bores and the amount of material removed thereby. Those skilled in the art will also appreciate that the slots and bores also reduce the amount of frictional interface between the interleaved stators and rotors.

The prior art has taught the use of ovalized or elliptical terminal bores, with the major axis of the oval being somewhat circumferentially aligned with the associated disk and the minor axis being more radially aligned therewith. However, such ovalized terminal bores have typically been of significant size and tend to remove excessive amounts of material from the associated disk. Accordingly, while the ovalized terminal bores greatly increase the terminal radius so as to minimize thermal stress, it also removes excessive amounts of material and while such ovalized terminal bores are an improvement over the prior art circular bores, a need for improvement thereover remains.

DISCLOSURE OF INVENTION

In light of the foregoing, it is a first aspect of the invention to provide a metallic aircraft brake disk having a thermal relief slot which minimizes the amount of material removed in forming the slot, while also minimizing the thermal stress generated at the end thereof.

Another aspect of the invention is the provision of a metallic aircraft brake disk having thermal relief slots, and in which each slot terminates in a configuration having a very significant outside radius when considered in the direction of the slot.

Yet a further aspect of the invention is the provision of a metallic aircraft brake disk having thermal relief slots, wherein each such slot is shaped like a dual armed hook anchor.

Still a further aspect of the invention is the provision of a metallic aircraft brake disk having thermal relief slots, wherein each such slot may be easily formed by laser cutting or the like.

An additional aspect of the invention to provide a metallic aircraft brake disk having thermal relief slots which allow for maximizing heat sink mass and braking efficiency, while being conducive to implementation using state of the art techniques.

The foregoing and other aspect of the invention which will become apparent as the detailed description proceeds are achieved by a metallic aircraft brake disk, comprising: an annular disk having concentric inner and outer circumferential surfaces; a plurality of force bearing slots in one of said circumferential surfaces for engaging said disk with a portion of an aircraft; and a plurality of thermal relief slots extending from one of said circumferential surfaces, each said thermal relief slot being anchor shaped for minimizing stress thereat.

BRIEF DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
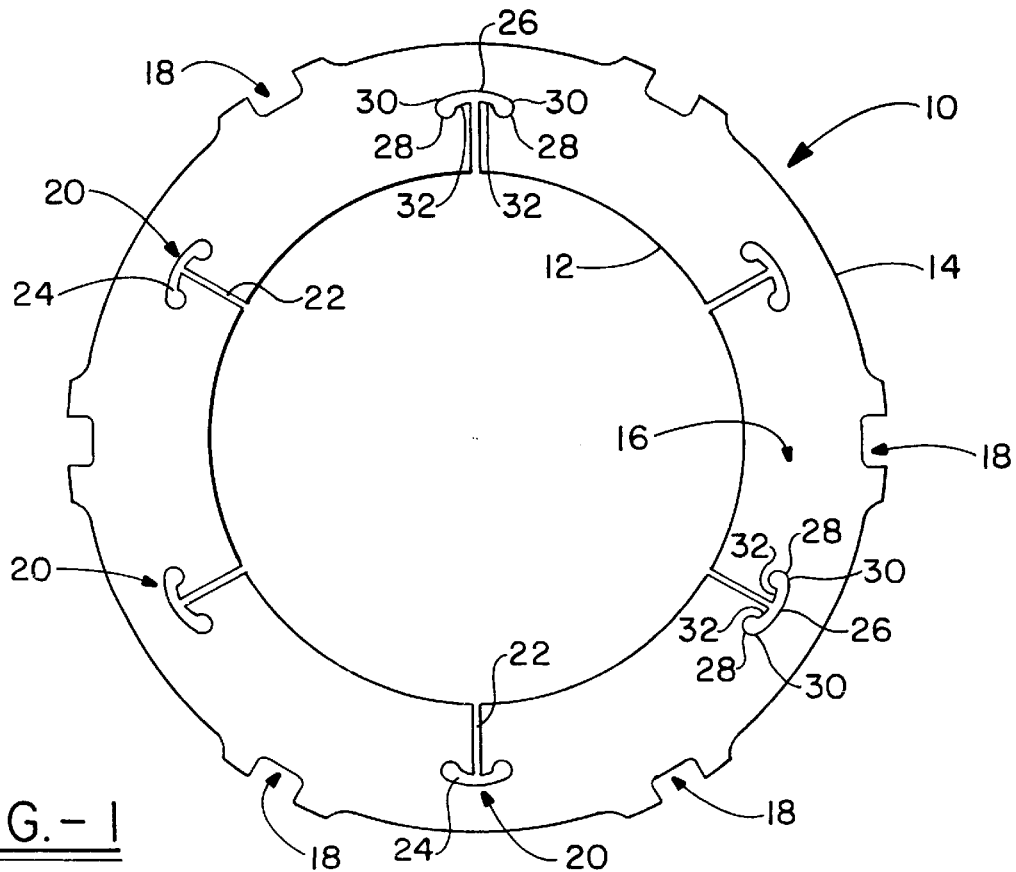
FIG. 1 is a front elevational view of a brake rotor made in accordance with the invention.

Referring now to the drawings and more particularly FIG. 1, it can be seen that a rotor disk of steel construction made in accordance with the invention is designated generally by the numeral 10. The disk 10 is of an annular nature, having an inner circumference 12 and an outer circumference 14. A wear surface 16 is defined between the circumferences 12, 14. As will be appreciated by those skilled in the art, a plurality of key slots 18 are uniformly spaced about the outer circumference 14 and are adapted to receive a wheel key in order to rotate with the associated aircraft wheel. Accordingly, the key slots 18 are force bearing slots.

A plurality of thermal relief slots 20 are also interposed within the annular rotor disk 10, the same being uniformly spaced thereabout. Six such slots are shown in the preferred embodiment of the invention, although the number and size of the slots may vary in accordance with the size of the disk. As illustrated, each of the thermal relief slots 20 is configured as a dual armed hook anchor. Each such slot 20 is characterized by an elongated radial slot 22 which extends beyond the midpoint of the radial width of the wear surface 16. According to the preferred embodiment of the invention, the elongated radial slot 22 enters from the inner circumferential surface 12, although the invention is contemplated as covering the entry of such slots from the outer circumferential surface 14. Since the key slots 18 are provided in the outer circumferential surface 14, it is preferred for purposes of structural integrity that the thermal relief slots 20 enter from the inner surface 12.

A head slot 24 is positioned at the end of the elongated radial slot 22, as shown. The head slot 24 defines the dual armed hooks of the anchor configuration. It will be appreciated that the head slot 24 is preferrably symmetrical with respect to the elongated slot 22. A particular design of the invention is to maximize the radius of the outermost surface of the head 22 when considered from the direction of the extension of the elongated slot 22. Accordingly, it is desired that the outer curvate edge 26 have a maximized radius R1. The head also is characterized by a pair of end lobes 28, each having a radius R2. A pair of transitional curvate edges 30 interconnect the curvate edge 26 with the end lobes 28, as shown. The transitional curvate edges each have a radius R3. Finally, an inner curvate edge 32, having a radius R4, interconnects the end lobes 28 with the end of the elongated radial slot 22.

In accordance with the invention, it is desired that R1 is greater than R3, R3 is greater than R4, and R4 is greater than R2. It will be appreciated that the edges which are more circumferentially aligned with the disk 10, such as the edges 26, 30, 32 are of a greater radius than the more radially directed end lobes 28. Indeed, it has been found that maximizing more circumferentially aligned radii is most effective in reducing thermal stress at the terminal bore. Indeed, it is the outer most curvate edges 26, 30 which are most determinative in this regard. Accordingly, the radii of these two surfaces are maximized, while the envelope defined by the elongated radial slot 22 and head slot 24 is minimized.

In accordance with the preferred embodiment of the invention, R1 is between 1.5 and three times R3, and preferably two times R3. Similarly, R1 is between two and four times R4, and preferably three times R4.

Figure 2:
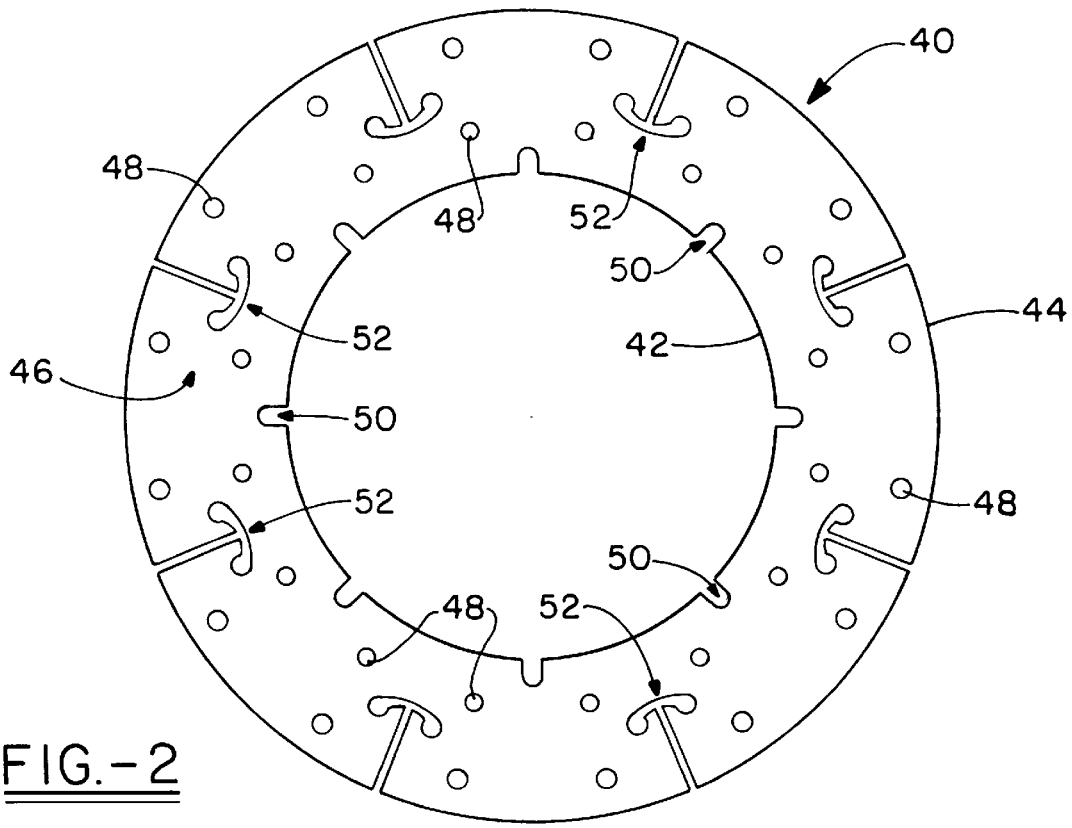
FIG. 2 is a front elevational view of a brake stator according to the invention.

With reference now to FIG. 2, it can be seen that a stator disk 40 also follows the teachings of the invention as set forth with respect to the rotor disk 10. The stator disk 40 is also an annular disk, having an inner circumferential surface 42 and an outer circumferential surface 44. An annular mounting surface 46 is defined between the inner and outer circumferential surfaces 42, 44. A plurality of apertures 48 pass through the annular mounting surface 46 for purposes of receiving rivets or the like to secure friction wear pads thereto. A plurality of spline slots 50 are uniformly spaced about the inner circumferential surface 42 for purposes of engaging a spline which is effectively connected to a stationary portion of the aircraft, such as the axle. In this regard, the spline slots 50 are force bearing during a braking operation.

A plurality of thermal relief slots 52 are uniformly spaced about the stator disk 40, entering from the outer circumferential surface 44 and extending into the annular mounting surface 46 beyond the center thereof. Again, the thermal relief slots 52 are in the shape of dual armed hook anchors, similar to the thermal relief slots 20. In the preferred embodiment of the invention, eight uniformly spaced thermal relief slots 52 are employed in the stator disk 40, although the number of such thermal relief slots may vary as required. Again, the thermal relief slots 52 are of the same configuration as the thermal relief slots 20, discussed above. It will again be appreciated that in the preferred embodiment of the invention thermal relief slots 52 enter from the outer circumferential surface 44 of the stator disk 40, since force bearing spline slots 50 enter from the inner circumferential surface 42. However, it has been found that the thermal relief slots 52 may enter from the same side as the force bearing splined slots 50, if desired.

The thermal relief slots 20, 52 need not always enter the disk from the same side. For example, the invention contemplates that the slots 20 might enter the rotor disk 10 from both the outer circumferential surface 14 as well as the inner circumferential surface 12. Similarly, the thermal relief slots 52 may enter the stator disk 40 from both the inner circumferential surface 42 as well as the outer circumferential surface 44. Typically, when entry from both inner and outer circumferential surfaces is made on the same disk, the slots 20, 52 circumferentially alternate between the inner and outer circumferential surfaces. Moreover, when thermal relief slots 20, 52 enter from both circumferential surfaces on the same disk, the slots 20, 52 typically terminate short of the middle of the associated wear surface 16 or mounting surface 46, rather than extending beyond it.

It will be appreciated that it is an object of the invention to maximize the radius of the outer curvate surface taken with respect to the direction of entrance of elongated radial slots 20, 52 while minimizing the amount of material removed from the disk to define the thermal relief slots 20, 52. It has been found that laser cutting may be employed to form such slots.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A metallic aircraft brake, comprising:

an annular disk having concentric inner and outer circumferential surfaces;

a plurality of force bearing slots in one of said circumferential surfaces for engaging said disk with a portion of an aircraft; and a plurality of thermal relief slots extending from one of said circumferential surfaces, said thermal relief slots being anchor shaped for minimizing stress thereat.

2. The metallic aircraft brake disk according to claim 1, wherein each said anchor shaped thermal relief slot comprises an elongated radial slot terminating in a head slot.

3. The metallic aircraft brake disk according to claim 2, wherein said head slot is symmetrical about said radial slot.

4. The metallic aircraft brake disk according to claim 3, wherein said head slot is defined by a plurality of interconnected curvate surfaces.

5. The metallic aircraft brake disk according to claim 4, wherein first and second curvate surfaces are generally circumferentially aligned with said disk, said first curvate surfaces having a radius of between 2 and 4 times the radius of said second curvate surface.

6. The metallic aircraft brake disk according to claim 5, wherein said first and second curvate surfaces are interconnected to each other at each of two ends thereof by third and forth curvate surfaces, said third and forth curvate surfaces having radii different from each other, and different from said first and second curvate surfaces.

7. The metallic aircraft brake disk according to claim 4, wherein said elongated radial slot extends more than half the distance between said inner and outer circumferential surfaces.

8. The metallic aircraft brake disk according to claim 7, wherein said elongated radial slot extends from a circumferential surface opposite the circumferential surface having said force bearing slots.

9. The metallic aircraft brake disk according to claim 4, wherein said disk is a stator disk.

10. The metallic aircraft brake disk according to claim 4, wherein said disk is a rotor disk.

* * * * *